United States Patent
Bertolet

[15] 3,693,267
[45] Sept. 26, 1972

[54] ANSWER AND SCORING SHEET

[72] Inventor: John C. Bertolet, 918 Great Plain Avenue, Needham, Mass. 02192

[22] Filed: May 5, 1970

[21] Appl. No.: 34,837

[52] U.S. Cl. ................................................35/48 A
[51] Int. Cl. ................................................G09b 3/06
[58] Field of Search ......35/48, 48 A, 31 R; 282/27 A

[56] References Cited

UNITED STATES PATENTS

| | | | |
|---|---|---|---|
| 2,061,168 | 11/1936 | Nixon | 282/22 A |
| 1,182,171 | 5/1916 | Harvey | 282/27 A |
| 3,503,142 | 3/1970 | Wolowicz et al. | 35/48 |
| 3,280,483 | 10/1966 | Davenport | 35/48 |
| 1,883,775 | 10/1932 | Finkenbinder | 35/48 |
| 3,086,300 | 4/1963 | Rugland et al. | 35/48 |
| 1,705,657 | 3/1929 | Clapp et al. | 35/48 |

*Primary Examiner*—Robert W. Michell
*Assistant Examiner*—J. H. Wolff
*Attorney*—Wolf, Greenfield and Sacks

[57] ABSTRACT

A self-correction answer and scoring sheet for use in multiple choice testing. The sheet is imprinted on the same surface both with a panel of groups of response boxes to be marked by the person tested and a scoring panel having scoring boxes which correspond to the correct or preferred answer for each group of response boxes. The sheet is folded so that the scoring panel underlies the response panel with each of the scoring boxes being in registry with a selected response box in each group, the selected response box corresponding to the correct or desired answer. Means are provided for forming a visible mark on the score sheet in response to impression of an answer on the response panel. A correct response is indicated by the formation of the visible mark within the score box. An incorrect answer is indicated by the formation of the visible mark outside of the score box.

6 Claims, 3 Drawing Figures

INVENTOR
JOHN C. BERTOLET

BY
Wolf, Greenfield & Sacks
ATTORNEYS

ANSWER AND SCORING SHEET

BACKGROUND OF THE INVENTION

This invention relates to an improved combination answer and scoring sheet of the type adapted for use in multiple choice testing, as in schools and the like and, more particularly, to an answer and scoring sheet in which a response is marked simultaneously on a scoring sheet which indicates the accuracy of the response.

A wide variety of answer and scoring sheets of the type described have been proposed and employed in the prior art. Perhaps among the more common of the self-correctable answer sheets is that in which the response is marked with a special pencil which produces an electrically conductive mark on the answer sheet. The sheet then is corrected mechanically by a machine which senses the presence or absence of the electrically conductive marks and provides, automatically, a readout of the test score. Although this technique has been used widely, it does not lend itself to more modern educational techniques in which it is desirable to provide an almost immediate indication of the accuracy of the answer as well as an indication of the correct answer if his response was erroneous.

In order to further the objectives of current modern educational techniques, other testing devices have been proposed having both an answer sheet on which the response is marked and a score sheet on which the response is duplicated simultaneously. In most of the prior devices, the answer and score sheets have been imprinted or formed on separate leaves which are printed separately. The leaves are assembled in the desired configuration and a pressure sensitive film is interposed between the answer and the score sheet to duplicate the response on the score sheet. The film may be on a separate leaf, such as on carbon paper, or may be formed by a special pressure sensitive coating on the back of the answer sheet itself. The coating may be patterned specially to form different kinds of marks on the score sheet to facilitate distinguishing between accurate and inaccurate responses.

Although the foregoing prior testing devices are directed to the objectives of modern program learning, they have not yet achieved the widespread use of which they are capable. This is due, at least in part, to the fact that production of such combined answer and score sheets is relatively cumbersome. In order to produce a number of such combined sheets, the answer sheet and score sheet must be printed separately, thus requiring separate printing runs. When a special patterned pressure sensitive coating is employed to duplicate the response on the score sheet, this coating also must be formed on the answer sheet or other associated leaf of the testing device. Furthermore, in most of these prior testing devices, the answer and score sheets are imprinted on separate leaves which thereafter must be arranged and bound properly.

Because of the foregoing difficulties, many schools or institutions which might employ such testing sheets with regular frequency have not done so. The multiple printing and subsequent binding generally has been considered to be too cumbersome and expensive an operation. It is among the primary objects of my invention to provide a testing device of the type described which may be produced in variable quantities and which avoids the foregoing difficulties. The testing device is adapted for use in school, homestudy courses, and the like.

SUMMARY OF THE INVENTION

In brief, each embodiment of the invention includes a testing device formed from a single sheet of paper which is folded into at least two panels, one of the panels being imprinted with an answer sheet and the other panel being imprinted with the scoring sheet. Both the scoring sheet and answer sheet are printed on the same side of the sheet before it is folded with the fold being made so that the score sheet underlies the answer sheet, with the score sheet and answer sheet facing in opposite directions away from each other. This enables the answer sheet and the score sheet to be imprinted in a single printing run.

The score sheet is divided into a plurality of groups of response regions in the usual manner for a multiple choice test. The score sheet is imprinted with scoring regions, there being one scoring region associated with each group of response regions on the answer sheet. When the sheet is folded to define and separate the answer panel and score panel, the scoring regions underlie their corresponding correct or preferred region in their associated response group of the answer sheet.

When the person being tested makes a mark in a selected response region, the mark is duplicated on the score sheet. Duplication of the mark on the score sheet is achieved by a third panel having a pressure sensitive coating which lies flat against the imprinted surface of the score sheet. In the preferred embodiment of the invention, the third panel is formed integrally with the sheet defining the first two panels and is folded to underlie the second panel on which the score sheet is imprinted. In this embodiment, the testing device is formed from a single, unitary sheet of commercially available "carbonless" paper which is folded into the above three panels.

In these carbonless sheets, special coatings are formed fully across each surface of the sheet. The sheet is folded so that one surface of the third panel faces and bears against the opposite surface of the second panel. The coating compositions cooperate to develop the mark on the score sheet when they are pressed as when making a response on the answer sheet. An example of such coating compositions may be found in U.S. Pat. No. 2,730,456 issued to B.K. Green Jan. 10, 1956.

A further aspect of the invention resides in the arrangement of the scoring regions on the scoring sheet in which only one scoring region is provided in association with each group of response regions. This provides ample space on the scoring sheet adjacent each scoring region in which a verbal answer or key word may be written. After an examination has been taken, the student may inspect the scoring sheet to determine whether his answer is correct; and if incorrect, the answer is evident verbally without referring back to the original questionaire.

It is among the primary objects of the invention to provide a testing device which is useful particularly in connection with modern educational techniques.

A further object of the invention is to provide a testing device including an answer sheet and a score sheet which may be fabricated from a single sheet of paper and in which the answer and score sheet are imprinted on only one side of the paper.

A further object of the invention is to provide an answer and scoring sheet of the type described which eliminates the need for assembling and binding a plurality of leaves in a finished answer sheet form.

Yet another object of the invention is to provide an answer and scoring sheet adapted for use in multiple choice testing which includes a single sheet of paper folded into three panels, two of which form the answer sheet and score sheet and the third of which cooperates with the score sheet to duplicate the response on the score sheet.

Another object of the invention is to provide a testing device including a single sheet of paper folded into at least two panels, with the panels being imprinted to define an answer sheet and a score sheet which face away from each other and in which the score sheet is hidden from view.

Still another object of the invention is to provide a testing device of the type described in which the scoring sheet may be inspected to permit the accuracy of a response to be determined and also to provide an indication and suggestion of the nature of the correct answer.

DESCRIPTION OF THE DRAWINGS

These and other objects and advantages of the invention will be understood more fully from the following detailed description thereof, with reference to the accompanying drawings wherein.

DESCRIPTION OF THE PREFERRED EMBODIMENT

Figure 1:
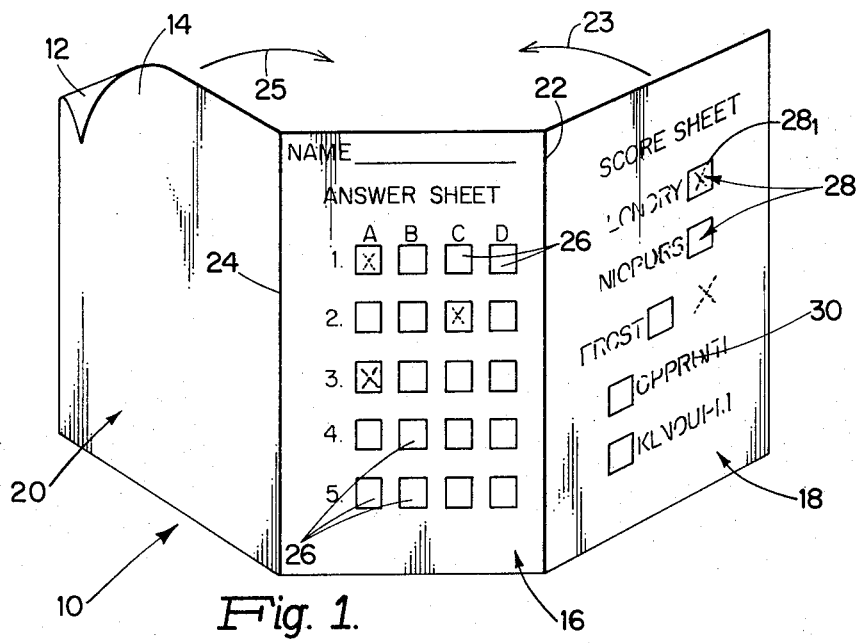
FIG. 1 is an illustration of the testing device, folded partly, and illustrating the manner in which the panels are arranged.

As shown in FIG. 1, the testing device includes a single sheet of paper 10 having a first surface 12 and second surface 14. In the preferred embodiment of the invention, the sheet is of the "carbonless reproduction" variety which is available commercially, for example, from the National Cash Register Company. Although the paper does not appear to have a conventional reproductive coating such as found in ordinary carbon paper, the first and second surfaces 12, 14 are coated with different compositions which are adapted to develop a mark on one of the surfaces when the surfaces are pressed together as by making a response with a pencil.

Figure 2:
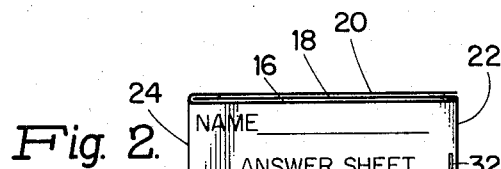
FIG. 2 is an illustration of the device as presented to the person being tested.

The sheet is divided into thirds to define a first panel 16, a second panel 18 continuous with one side of the first panel, and a third panel 20 which is continuous of the other side of the first panel 16. Each of the panels are defined by and are intended to be folded along fold lines 22, 24. The fold lines 22, 24 are spaced so that each of the three panels will be of substantially identical dimensions and may be folded as shown by the arrows 23, 25 into the configuration as shown in FIG. 2. In this folded configuration, the second surfaces of the first and second panel face away from each other, and the first surfaces face toward each other. The third panel is folded beneath and underlies the second panel with the first surface of the third panel bearing against and facing the second surface of the second panel.

The exposed second surface of the first panel serves as the answer sheet on which the person being tested marks his responses. The second surface of the underlying second panel serves as the score sheet. The coating on the surface of the score sheet cooperaties with the coating on the underlying first surface of the third sheet to form a visible mark on the score sheet when a response is marked on the answer sheet.

Thus, both the answer sheet and score sheet are imprinted on the second surface 14 of the sheet 10. Because all of the necessary printing is made only on one surface of the sheet 10, the entire device may be printed in a single printing run. The sheet need only then be folded to the above configuration. There is no need to collate a number of separate leaves for each testing device and then to secure or bind the collated leaves. Additionally, the paper may be obtained in its precoated form and it is unnecessary for the user (such as a school or other institution) to coat any of the surfaces of the panel with a pressure sensitive coating or in a special predetermined pattern corresponding to the particular test to be given.

The drawings illustrate but one arrangement for imprinting the answer and score sheets. For example, the answer sheet may be provided with a plurality of scoring regions 26 that are arranged on the second surface of the first panel in five groups of four scoring regions each region indicated by the sequence 1, 2, 3, 4 etc. and corresponding to a particular question on the questionaire used in the test. Each group of scoring regions may be disposed vertically one above another so that the response boxes 26A, 26B, 26C, and 26D, all are arranged in vertical alignment. The test sheet or questionaire presented to the student is collated to the groups of scoring regions in the usual manner. In the illustrative embodiment, each multiple choice question would have four possible responses.

The scoring sheet which is imprinted on the second surface 14 of the second panel 18 includes a plurality of scoring regions indicated generally by the reference character 28. The scoring sheet is imprinted so that only one of the scoring regions 28 is associated with each group of response regions on the answer sheet. Each scoring region 28 is imprinted on the scoring sheet so that when the second panel 18 is folded beneath the first panel 16 each scoring region 28 will underlie and will be in registry with the response region 26 in its associated response group which corresponds to the correct or preferred answer. For example, if the correct answer to the questions corresponding to response group 1 would be indicated by marking the response region $26_{1A}$, the scoring region $28_1$ would be located in registry with response region $26_{1A}$. If the person being tested selects the correct answer, his response in response region $26_{1A}$ will be duplicated on the score sheet within the scoring region as shown in phantom. If his response is incorrect, the response will be duplicated on the scoring sheet but not within the scoring region 28 as shown in phantom in connection with a mark placed in response region $26_{2C}$. After the test, the student may inspect the scoring sheet to determine readily and quickly the accuracy of his responses.

A additional feature of the invention is that because only the correct or preferred scoring region is deliniated on the scoring sheet there is sufficient space left on the sheet near that scoring region to imprint a key word or phrase as shown at 30 in connection with response region 4, which indicates, verbally, the correct or preferred response or answer. This is preferred and is compatable with learning processes used in modern educational techniques which enable a student to compare the accurate answer with his response almost immediately after the response has been made.

When preparing the testing device, it is printed, folded, and then may be sealed in its folded configuration by a few staples 32 or other sealing arrangements. The sealing arrangement preferably should be simple so that the student may open easily the testing device and inspect the score sheet after the test has been completed.

Figure 3:
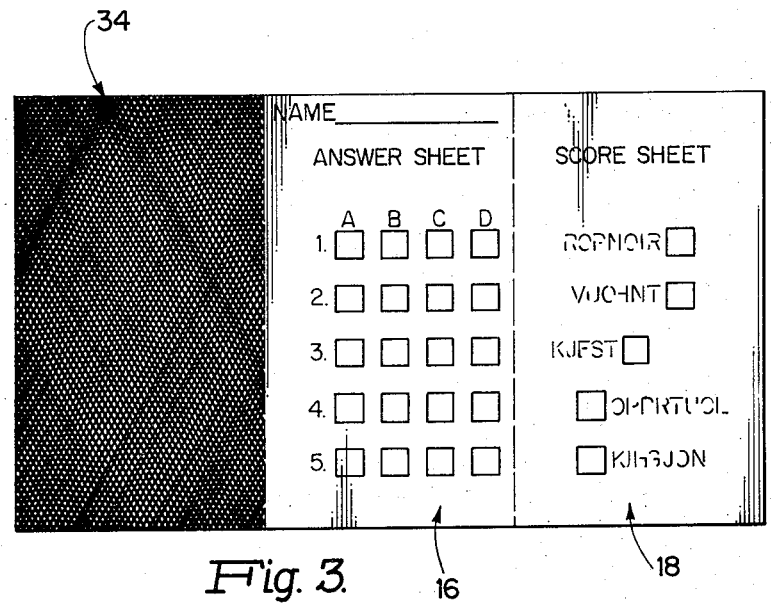
FIG. 3 is an illustration of a modified embodiment of the device in which one of the panels is rendered substantially opaque.

In some instances, it may be desirable to prevent the student from cheating by holding the folded test sheet up to the light to inspect the location of the imprinted scoring regions 28. As shown in FIG. 3, this can be prevented by imprinting one of the panels with an opaque pattern 34 to preclude light transmission through the folded testing device. The opaque coating may be continuous over the full surface of one of the panels or may be in a pattern, as shown, which would render observation of the scoring regions difficult or impossible. In this modification, it is preferred to imprint the opaque coating on the second surface of the third panel simultaneously with the imprinting of the answer sheet and scoring sheet on the second surface of the first and second panels. The opaque panel thus may be provided without any additional printing runs.

Although, in the preferred embodiment of the invention, the duplication of the response is formed on the scoring sheet by cooperation between special coatings on the opposite surfaces of the same integral sheet, there may be instances in which it is desired to develop the duplicated mark on the scoring sheet by a more conventional arrangement such as common carbon paper. In this case, the sheet may omit the continuous third panel with the first two panels being arranged, as described, to provide the underlying second panel in which the score sheet faces away from the answer sheet on the first panel. During testing, the score sheet is placed on a suitably coated sheet (as carbon paper) with the answer sheet being exposed to the person being tested. The coated sheet preferably is attached to the first and second panels.

It should be understood that the foregoing description of the invention is intended merely to be illustrative thereof and that other embodiments and modifications thereof will be apparent to those skilled in the art without departing from its spirit.

Having thus described the invention, what I desire to claim and secure by Letters Patent is:

1. A testing device comprising:
   a unitary sheet of paper having a first surface and a second surface, said sheet being foldable into three panels in which the first surfaces of the first and second panels face inwardly toward each other, and where the second surfaces of said first and second panels face outwardly away from each other, the third of said panels being foldable to underlie said first panel so that the first surface of said third panel faces inwardly toward the second surface of said first panel;
   a plurality of selection regions defined on the second surface of said second panel, said selection regions being arranged in at least one group thereof and in a pattern to define an answer sheet on which a response to a particular question may be impressed in any selection region of a particular group thereof;
   scoring regions defined on the second surface of said first panel, each of said scoring regions being disposed so that when said sheet is folded, said scoring regions will be in substantial registry with selected of said selection regions on said answer sheet whereby said scoring region may indicate directly whether an impression has been made in a particular selection region of said answer sheet; and
   at least said second surface of said first panel and said first surface of said third panel being coated with cooperative compositions adapted to form said visible mark on said second surface of said first panel when said third panel underlies said first panel and in response to an impression made on said second surface of said second panel.

2. A testing device as defined in claim 1 wherein said sheet is folded to define said panels and said configuration thereof, and means for sealing said folded sheet in said folded configuration.

3. A testing device defined in claim 2 further comprising:
   means associated with at least one of the said panels for precluding visual determination of the location of said scoring regions on said first panel when said sheet is folded into said three-panel configuration.

4. A testing device as defined in claim 3 wherein said means for precluding said visual determination of the location of said scoring regions comprises:
   means forming an opaque coating on at least a portion of one surface of one of said panels.

5. A testing device as defined in claim 4 wherein said opaque coating is formed on said second surface of said third panel.

6. A testing device as defined in claim 1 wherein the first and second surfaces of said sheet each are coated fully and continuously with their respective compositions.

* * * * *